United States Patent

[11] 3,619,618

[72] Inventors Jurgen Thorn
Haar;
Horst Moritz, Munich, both of Germany
[21] Appl. No. 17,174
[22] Filed Mar. 6, 1970
[45] Patented Nov. 9, 1971
[73] Assignee Siemens Aktiengesellschaft
Berlin and Munich, Germany
[32] Priority Mar. 17, 1970
[33] Germany
[31] P 19 13 398.3

[54] LASER SYSTEM FOR CONTROLLED GUIDANCE OF MOBILE MACHINE
4 Claims, 3 Drawing Figs.

[52] U.S. Cl. .......... 250/203, 210/215, 210/209, 172/4.5
[51] Int. Cl. .......... G01j 1/20
[50] Field of Search .......... 250/215, 217, 203, 234, 59, 206, 214; 350/172; 37/DIG. 20; 172/4.5; 330/69; 356/172

[56] References Cited

UNITED STATES PATENTS

| | | | |
|---|---|---|---|
| 3,141,418 | 7/1964 | Clayborne et al. .......... | 356/172 X |
| 3,364,356 | 1/1968 | Jones .......... | 172/4.5 X |
| 3,419,809 | 12/1968 | Lach et al. .......... | 330/69 X |
| 3,452,207 | 6/1969 | Tsukkerman .......... | 250/215 |
| 3,514,608 | 5/1970 | Whetter .......... | 250/217 X |

*Primary Examiner*—Walter Stolwein
*Attorneys*—Curt M. Avery, Arthur E. Wilfond, Herbert L. Lerner and Daniel J. Tick

ABSTRACT: A receiver affixed to a mobile machine comprises at least two spaced photosensitive units, positioned transversely to a reference plane formed by a flared modulated laser guide beam, on on each side of the reference plane. An initial amplifier having a variable load is connected to the photosensitive units and a difference amplifier is connected to the amplifier. The difference amplifier varies the load of the initial amplifier so that saturation of such amplifier is avoided at strong intensities of the laser beam.

LASER SYSTEM FOR CONTROLLED GUIDANCE OF MOBILE MACHINE

DESCRIPTION OF THE INVENTION

The invention relates to the controlled guidance of a mobile machine. More particularly, the invention relates to a laser system for the controlled guidance of a mobile machine.

The laser system of the invention is that disclosed in copending patent application Ser. No. 866,568, filed Oct. 15, 1969 and assigned to the same assignee as the present application. The laser system utilizes a laser guide beam which flares in a plane. A pair of photosensitive units are arranged transversely to the plane of the laser beam, one on each side thereof. The photosensitive units produce control signals, via a difference amplifier, to control a mobile machine.

The system of the invention is based on the concept that in order to provide accurate control with a receiver having only two photosensitive units, such photosensitive units must be positioned relatively close to each other. Thus, even small deviations from the laser beam reference plane may be detected or determined. In such a case, the laser beam, which is normally in a plane between the two photosensitive units or photocells, effects or influences both photosensitive units even in the event of a slight lateral displacement. This makes an automatic indication by independent photosensitive units impossible.

When a difference amplifier is utilized, however, it functions to determine the slight variations in the laser beam density at each of the two photosensitive units. Furthermore, the difference amplifier functions to utilize such slight variations to produce a control signal for driving or controlling the mobile or fabricating machine.

The mobile or fabricating machine to be controlled may comprise, for example, a tunnel propulsion machine, a drainage plow or a track laying machine, and moves, in the course of a control cycle, either away from or toward the stationary source of the laser beam. The distance of the controlled machine may thus vary between a few meters and several hundred meters. At a distance of several hundred meters between the source of the laser beam and the mobile machine, the control signal formed by the difference amplifier must be sufficiently amplified so that it may function as a proper control signal to correct possible deviations. This entails considerable amplification of the signals produced by the photosensitive units. The considerable amplification of the signals produced by the photosensitive units creates difficulties when the machine is in close proximity with the source of the laser beam. Such difficulties entail the saturation of the amplification stages in the receiver mounted on the machine as well as a reduced response sensitivity.

The principal object of the invention is to provide a new and improved laser system for the controlled guidance of a mobile machine.

An object of the invention is to provide a laser system for the controlled guidance of a mobile machine, which system overcomes the disadvantages of known systems of similar type.

An object of the invention is to provide a laser system for the controlled guidance of a mobile machine, which system functions without loss of sensitivity and with efficiency, effectiveness and reliability.

An object of the invention is to provide a laser system for the controlled guidance of a mobile machine with accuracy.

An object of the invention is to provide a laser system for the controlled guidance of a mobile machine, which system is of simple structure, but accurate in operation.

In order to accomplish the aforedescribed objects, the laser system of the invention utilizes a automatically operating control circuit for its amplified stages, which control circuit functions to prevent said amplifier stages from moving into their saturation range. The invention is predicated upon the concept that the sensitivity loss in the range of small distances between the source of the laser beam and the controlled machine is due to the saturation of the amplifier stages connected to the outputs of the photosensitive units. Due to the flaring of the beam, the density of the beam impingement upon the photosensitive units is considerably greater at smaller distances between the source of the laser beam and the machine than at greater distances therebetween, as hereinbefore described. The amplification required to provide an adequate control signal at great distances between the source of the laser beam and the controlled machine invariably results in overmodulation of the amplifiers connected to the outputs of the photosensitive units. This is a result of the high laser beam densities to which the photosensitive units are exposed in the vicinity of the source of the laser beam.

The photosensitive units positioned transversely to the plane of the flared laser beam should generally be spaced from each other by a distance which is less than the width of said laser beam transverse to the plane of flare. This is necessary in order to detect and correct even minute displacements. This results in the relatively slight partial beam output which impinges upon the photosensitive units being so large in the vicinity of the source of the laser beam that, when the center of the laser beam is positioned exactly equidistantly between the photosensitive units, the amplifiers connected to the outputs of said photosensitive units will be saturated, and a variation or shift in the center of the laser beam, due to an error or deviation in the operation of the machine will cause a variation in the output signal only at considerably large displacements. When saturation of the amplifier stages is avoided by the system of the invention, the sensitivity range of said system increases considerably, by orders of magnitude, so that even displacements of less than 1 mm. are sufficient for a control or correcting operation.

Since the amplifiers are usually saturated only in their last stages, the control circuit is provided in a simple manner by utilizing variable loads connected in the outputs of the input amplifier stages before the final amplifier stages, which final amplifier stages tend to become saturated. The loads are varied in accordance with a sum signal provided by the outputs of the amplifier stages. The sum signal is provided by a difference amplifier stage connected to the outputs of the final amplifier stages. The variable loads preferably comprise transistor circuits.

In accordance with the present invention, a laser system for the controlled guidance of a mobile machine in a reference plane comprises laser apparatus producing a guide flared in a reference plane. A receiver is affixed to a mobile machine. The receiver comprises two spaced photosensitive units positioned transversely to the reference plane, one on each side of the reference plane. Each of a pair of initial amplifier stages and final amplifier stages is connected to the output of a corresponding one of the photosensitive units. A control circuit comprising a difference amplifier is connected between the outputs of the final amplifier stages and the inputs thereof for preventing the saturation of said final amplifier stages. The difference amplifier is connected to the final amplifier stages in a manner whereby deviation of the mobile machine from the reference plane produces an output control signal of the difference amplifier for guiding mobile machine back into the reference plane.

The control circuit comprises a pair of variable load means each connected to a corresponding one of the initial and final amplifier stages for varying the load thereof and a difference amplifier having a pair of inputs each connected to the output of each of the final amplifier stages and an output connected in common to each of the variable load means.

EAch of the variable load means is connected to a common point between the corresponding initial amplifier stage and the corresponding final amplifier stage.

The difference amplifier includes an adder for adding the output signals of each of the final amplifier stages and supplying the sum of the signals in common to both of the variable load means.

In order that our invention may be readily carried into effect, it will now be described with reference to the accompanying drawing, wherein.

In the FIGS., the same components are identified by the same reference numerals. The fabricating or mobile machine is not shown in the FIGS. in order to maintain the clarity of illustration.

Figure 1:
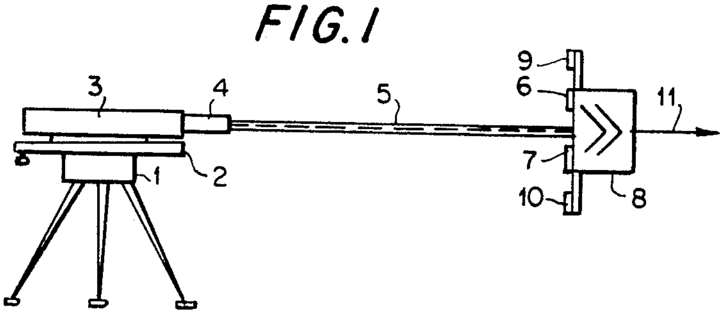
FIG. 1 is a schematic diagram of a side view of an embodiment of the laser device of the aforedescribed copending patent application for the controlled guidance of a fabricating machine.
Figure 2:
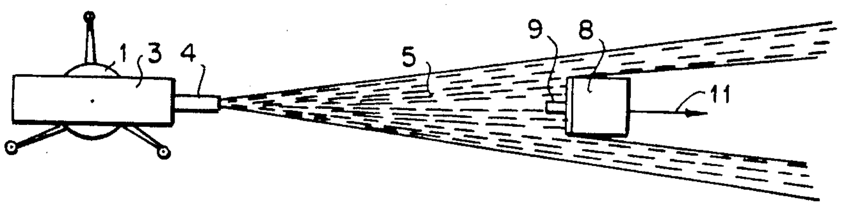
FIG. 2 is a schematic diagram of a top view of the embodiment of FIG. 1 of the aforedescribed copending patent application.

In FIGS. 1 and 2, a structure 1 supports mounted laser apparatus 3 via a Nivellier device 2. The laser apparatus 3 produces a laser beam which is flared or fanned in a horizontal plane by a flaring device 4, which may comprise a cylindrical lens. The flared laser beam 5 constitutes the reference plane, relative to which the fabricating machine must maintain its height. In accordance with usage, of course, an inclined plane may be utilized as the reference plane rather than a horizontal plane.

The fabricating machine, which may be, for example, the grab of a drainage plow, is provided with receiving apparatus. The receiving apparatus comprises photosensitive units, elements or cells which, in the basic structure, number only two overlapping photosensitive units 6 and 7, as shown in FIG. 1. Since the laser beam 5 is not actually as sharply limited in its vertical and horizontal dimensions or boundaries, as shown in FIGS. 1 and 2, the photosensitive units 6 and 7 are excited or actuated even when said laser beam does not fully impinge upon one of said photosensitive units. The device thus responds to the slightest vertical deviations of the fabricating machine from the reference plane.

A difference amplifier 8 has inputs connected to the outputs of the photosensitive units 6 and 7 and an output connected to an output line 11. The output signal produced by the difference amplifier 8 is zero when the center of gravity of the laser beam 5 is centered between the photosensitive units 6 and 7. During a vertical deviation of the fabricating machine, which thus causes a corresponding vertical deviation of the receiving apparatus comprising the photosensitive units 6 and 7, one of said photosensitive units is illuminated more strongly than the other. A positive or negative signal of greater or lesser amplitude is thus produced by the difference amplifier 8.

The sensitivity of response of the device of our invention may be adjusted by expanding the laser beam 5 in vertical directions, as well as through the distance between the two photosensitive units 6 and 7. The device will also respond if a sudden deviation of the fabricating machine from the reference plane causes the laser beam 5 to move downward via one of the two photosensitive units 6 and 7, provided that at least part of said laser beam still impinges upon said one of said photosensitive units.

When such sudden shifts from the reference plane occur frequently, it may be of advantage to provide a pair of additional photosensitive units, cells or elements 9 and 10. The additional photosensitive unit 9 may be vertically positioned above the photosensitive unit 6 and the additional photosensitive unit 10 may be vertically positioned below the photosensitive unit 7. The additional photosensitive units 9 and 10 may be connected to the inputs of a second difference amplifier. The output signal produced by the second difference amplifier may be utilized as a warning or alarm, or to deenergize the fabricating machine by appropriate control circuit, since any deviations from the reference plane strong enough to affect the additional photosensitive units 9 and 10 would almost certainly require that the fabricating machine be readjusted.

Normally, the two photosensitive units 6 and 7 and the single difference amplifier 8 are sufficient to guide the fabricating machine in the reference plane. It is therefore suitable to position the photosensitive units 6 and 7 longitudinally, in vertical directions, so that they will respond even at greater deviations in height. The output lead 11 of the difference amplifier 8 delivers a control signal which, after appropriate reshaping, if such reshaping is necessary, may be utilized to control the height of the fabricating machine.

FIG. 2 shows all the components of FIG. 1, except for the photosensitive units 6, 7 and 10. The reference plane provided by the laser beam 5 may be adjusted by adjustment of the laser apparatus 3 with the assistance of the Nivellier device 2 (shown in FIG. 1, but not in FIG. 2).

Figure 3:
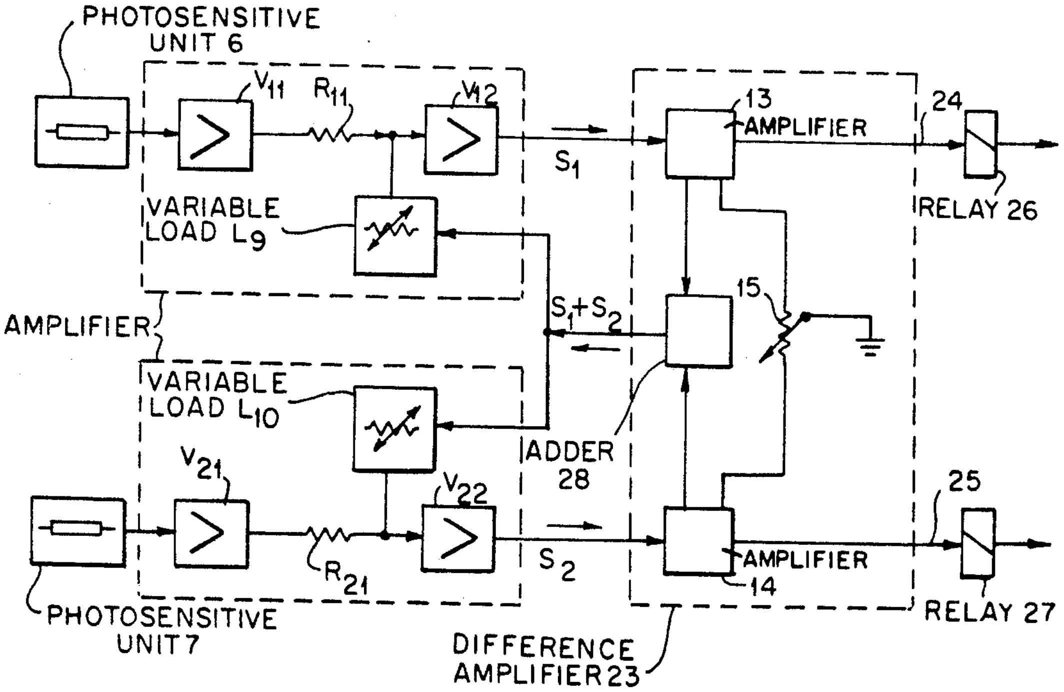
FIG. 3 is a block diagram of an embodiment of the laser system of the invention for the controlled guidance of a mobile machine.

In FIG. 3, a two channel receiver comprises the two photocells 6 and 7 of FIG. 1. The photocell or photosensitive unit 6 is provided for one channel and the photocell or photosensitive unit 7 is provided for the other channel. The output signal produced by the photosensitive unit 6 is supplied to an initial amplifier stage $V_{11}$ and thence to a final amplifier stage $V_{12}$ of the corresponding channel. The output signal produced by the photosensitive unit 7 is supplied to an initial amplifier stage $V_{21}$ and thence to a final amplifier stage $V_{22}$ of the corresponding channel. The outputs of the final amplifier stages $V_{12}$ and $V_{22}$ are supplied to corresponding inputs of a difference amplifier 23.

The difference amplifier 23 provides a first output signal in an output lead 24 and a second output signal in an output lead 25. The output signal in the output lead 24 which includes amplifier 13 comprises a positive control signal which controls a relay 26. The output signal in the output lead 25 which includes amplifier 14 comprises a negative control signal which controls a relay 27. Each of the positive and negative control signals controls its corresponding relay when a specific magnitude is exceeded. The specific reference magnitude is determined by a variable resistor 15. The difference amplifier 23 includes an adder 28 which functions to add the output signal $S_1$ of the final amplifier stage $V_{12}$ and the output signal $S_2$ of the final amplifier stage $V_{22}$ to produce a sum signal $S_1+S_2$.

A variable load $L_9$ is connected to a common point in the connection between the initial amplifier stage $V_{11}$ and the final amplifier stage $V_{12}$. A variable load $L_{10}$ is connected to a common point between the initial amplifier stage $V_{21}$ and the final amplifier stage $V_{22}$. The sum signal $S_1+S_2$ is supplied in common to each of the variable loads $L_9$ and $L_{10}$ and functions to control the magnitudes of said variable loads.

The control circuit of the invention functions to provide a small amplification in each of the channels of the receiver when a high laser beam intensity impinges upon the photosensitive units 6 and 7, due to the near proximity of the source of the laser and said photosensitive units. When a smaller laser beam intensity impinges upon the photosensitive units 6 and 7, due to a greater distance between the source of the laser beam and said photosensitive units, the control circuit of the invention provides a greater amplification then in the case of the greater laser beam intensity. Thus, the output control signals in the output leads 24 and 25 of the difference amplifier 23 control the positioning of the mobile machine via their corresponding relays 26 and 27 even at very slight variations or shifts of the laser beam center, regardless of the distance of said mobile machine from the source of the laser beam.

It is, of course, possible to control each channel separately by its corresponding signal $S_1$ or $S_2$, rather than combining such signals to a sum signal and utilizing the sum signal for such control.

While the invention has been described by means of a specific example and in a specific embodiment, we do not wish to be limited thereto, for obvious modifications will occur to those skilled in the art without departing from the spirit and scope of the invention.

We claim:

1. A laser system for the controlled guidance of a mobile machine in a reference plane, said system comprising laser apparatus producing a guide beam flared in a reference plane; and receiving means affixed to a mobile machine, said receiving means comprising two spaced photosensitive units positioned transversely to said reference plane, on each side of said reference plane, and a pair of initial amplifier stages and final amplifier stages each one of said pair connected to the output of a corresponding one of said photosensitive units, a control circuit comprising a difference amplifier connected between the outputs of said final amplifier stages and the inputs thereof for preventing the saturation of said final amplifier stages, said difference amplifier being connected to said final amplifier stages in a manner whereby deviation of the mobile machine from said reference plane produces an output control signal of said difference amplifier for guiding the mobile machine back into said reference plane.

2. A laser system as claimed in claim 1, wherein said control circuit comprises a pair of variable load means each one of said pair connected to a corresponding one of the initial and final amplifier stages for varying the load thereof, and a difference amplifier having a pair of inputs each connected to the output of each of said final amplifier stages and an output connected in common to each of said variable load means.

3. A laser system as claimed in claim 2, wherein each of said variable load means is connected to a common point between the corresponding initial amplifier stage and the corresponding final amplifier stage.

4. A laser system as claimed in claim 3, wherein said difference amplifier includes an adder for adding the output signals of each of said final amplifier stages and supplying the sum of said signals in common to both of said variable load means.

* * * * *

PO-1050
(5/69)

UNITED STATES PATENT OFFICE
CERTIFICATE OF CORRECTION

Patent No. 3,619,618 Dated November 9, 1971

Inventor(s) JURGEN THORN & HORST MORITZ

It is certified that error appears in the above-identified patent and that said Letters Patent are hereby corrected as shown below:

In the heading to the printed specification , the date of priority should be changed from "March 17, 1970" to --March 17, 1969--

Signed and sealed this 18th day of July 1972.

(SEAL)
Attest:

EDWARD M.FLETCHER,JR.
Attesting Officer

ROBERT GOTTSCHALK
Commissioner of Patents